(12) United States Patent
Jee et al.

(10) Patent No.: US 8,325,835 B2
(45) Date of Patent: Dec. 4, 2012

(54) NON-CONTINUOUS ORTHOGONAL FREQUENCY DIVISION MULTIPLEXING SYSTEM AND CONTROL METHOD OF NON-CONTINUOUS ORTHOGONAL FREQUENCY DIVISION MULTIPLEXING SYSTEM

(75) Inventors: Deockgu Jee, Daejeon (KR); Jin Up Kim, Daejeon (KR); Joonhyuk Kang, Daejeon (KR); Keongkook Lee, Daejeon (KR); Jungho Myung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 270 days.

(21) Appl. No.: 12/816,344

(22) Filed: Jun. 15, 2010

(65) Prior Publication Data

US 2010/0316147 A1 Dec. 16, 2010

(30) Foreign Application Priority Data

Jun. 15, 2009 (KR) .................. 10-2009-0052855

(51) Int. Cl.
*H04L 27/28* (2006.01)

(52) U.S. Cl. ........ 375/260; 375/229; 375/232; 375/295; 375/316; 375/340; 375/350; 370/203; 370/208; 370/210; 370/480; 455/91; 455/130; 341/173; 341/180; 708/300; 708/404

(58) Field of Classification Search ............. 375/229, 375/232, 260, 295, 316, 340, 350; 455/91, 455/130; 370/203, 208, 210, 480; 341/173, 341/180; 708/300, 404
See application file for complete search history.

(56) References Cited

U.S. PATENT DOCUMENTS

2005/0080833 A1* 4/2005 Smith ........................ 708/404
2006/0109897 A1* 5/2006 Guo et al. .................... 375/232
2007/0061755 A1 3/2007 Taboada et al.

FOREIGN PATENT DOCUMENTS

JP 1993-174074 7/1993
KR 2009-0127779 A 12/2009

OTHER PUBLICATIONS

Rakesh Rajbanshi et al "An Efficient Implementation of NC-OFDM Transceivers for Cognitive Radios" In in Proc. of 1st Conf. on Cognitive Radio Oriented Wireless Networks and Communications, 2006.*
Rogerio Alves et al., "General FFT Pruning Algorithm," Proc. 43rd IEEE Midwest Symp. On Circuits and Systems, vol. 3, Aug. 8-11, 2000, pp. 1192-1195.

* cited by examiner

*Primary Examiner* — Leon Flores
(74) *Attorney, Agent, or Firm* — Rabin & Berdo, P.C.

(57) ABSTRACT

A Non-Continuous Orthogonal Frequency Division Multiplexing (NC-OFDM) system may be provided. The NC-OFDM system, including: a sensing unit to determine whether to use at least one frequency band; a band control unit to disable a subcarrier with respect to a frequency band in use as a result of the determination; a pruning determination unit to determine whether a number of points where the subcarrier is disabled is greater than a threshold value; a pruning retrieval unit to retrieve a pruning path generated by the disabling of the subcarrier, when the number of points is greater than the threshold value; and a Fourier transform unit to perform a Fast Fourier transform (FFT) or Inverse FFT (IFFT) by applying the pruning path to the subcarrier.

14 Claims, 8 Drawing Sheets

NON-CONTINUOUS ORTHOGONAL FREQUENCY DIVISION MULTIPLEXING SYSTEM AND CONTROL METHOD OF NON-CONTINUOUS ORTHOGONAL FREQUENCY DIVISION MULTIPLEXING SYSTEM

CROSS-REFERENCE TO RELATED APPLICATION

This application claims the benefit of Korean Patent Application No. 10-2009-0052855, filed on Jun. 15, 2009, in the Korean Intellectual Property Office, the disclosure of which is incorporated herein by reference.

BACKGROUND

1. Field of the Invention

The present invention relates to a system to reduce complexity of Fast Fourier Transform (FFT) calculation used in a transmitting/receiving end of a Non-Continuous Orthogonal Frequency Division Multiplexing (NC-OFDM) that may be used in a cognitive radio environment, and an algorithm that may be applied to the system.

2. Description of Related Art

A Non-Continuous Orthogonal Frequency Division Multiplexing (NC-OFDM) may avoid a frequency band, currently used by licensed users, and may transmit/receive data using only frequency bands not being otherwise used, by using a spectrum sensing method.

That is, the OFDM may not use a subcarrier corresponding to a frequency band, used by licensed users, by disable use of the subcarrier, and may use remaining frequency bands by activating the remaining frequency band.

A transmitting/receiving end using the OFDM may efficiently perform modulation and demodulation using a Fast Fourier Transform (FFT) algorithm. However, since an OFDM may disable a plurality of subcarriers, all hardware resources of FFT may not be used.

Accordingly, when a subcarrier is disabled, a new approach to efficiently perform a FFT may be required to perform OFDM.

SUMMARY

According to an aspect of the present invention, there is provided a Non-Continuous Orthogonal Frequency Division Multiplexing (NC-OFDM) system, including: a sensing unit to determine whether to use at least one frequency band; a band control unit to disable a subcarrier with respect to a frequency band in use as a result of the determination; a pruning determination unit to determine whether a number of points where the subcarrier is disabled is greater than a threshold value; a pruning retrieval unit to retrieve a pruning path generated by the disabling of the subcarrier, when the number of points is greater than the threshold value; and a Fourier transform unit to perform a Fast Fourier transform (FFT) or an Inverse FFT (IFFT) by applying the pruning path to the subcarrier.

According to another aspect of the present invention, there is provided an apparatus of providing a pruning algorithm of an NC-OFDM system, the apparatus including: a calculation unit to calculate a number of zero input points of a corresponding stage of a FFT; a pruning determination unit to determine whether the number of zero input points is greater than a threshold value; and a pruning retrieval unit to retrieve a pruning path, generated by inputting zero, when the number of zero input points is greater than the threshold value.

According to still another aspect of the present invention, there is provided a control method of an NC-OFDM system, the control method including: determining whether to use at least one frequency band; disabling a subcarrier with respect to a frequency band in use as a result of the determination; determining whether a number of points where the subcarrier is disabled is greater than a threshold value; retrieving a pruning path generated by the disabling of the subcarrier, when the number of points is greater than the threshold value; and performing a FFT or an IFFT where the pruning path is applied.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirit of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

According to example embodiments, a Non-Continuous Orthogonal Frequency Division Multiplexing (NC-OFDM) system may be used to reduce complexity when a Fast Fourier Transform (FFT) operation is performed, and be based on a method of removing an operation with respect to a disabled subcarrier.

According to example embodiments, the NC-OFDM system may determine whether to use at least one frequency band, disable a subcarrier with respect to a frequency band in use, determine whether a number of points where the subcarrier is disabled is greater than a threshold value, and when the number of points is greater than the threshold value, retrieve a pruning path generated by the disabling of the subcarrier. Accordingly, complexity of FFT operation may be reduced and an operation speed may be improved.

Hereinafter, a configuration of an NC-OFDM system according to an embodiment of the present invention will be described in detail with reference to FIG. 1.

Figure 1:
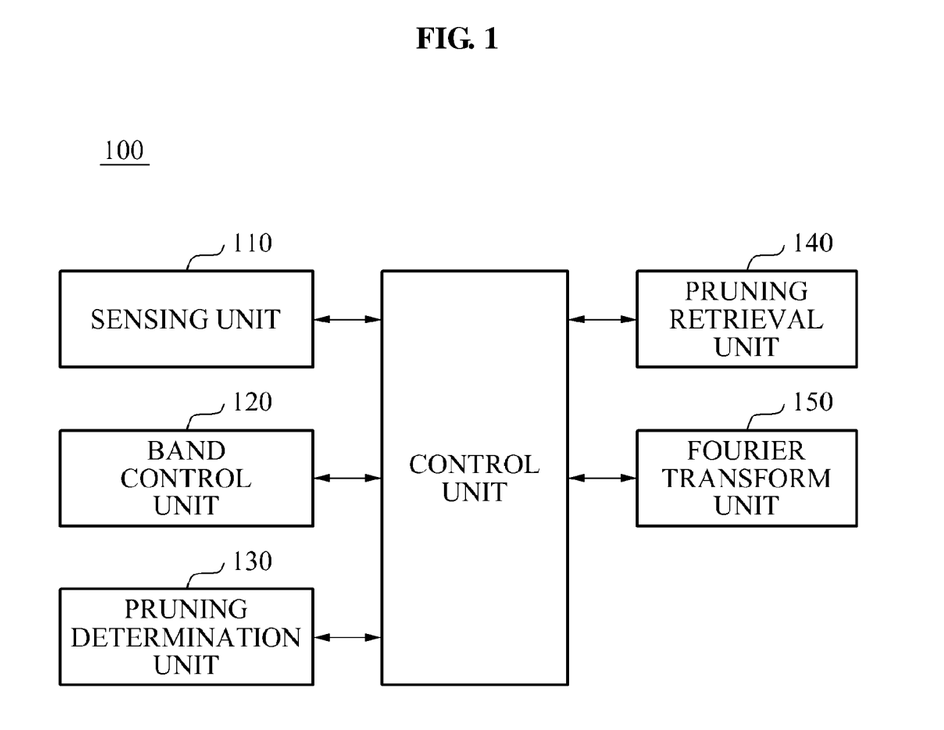
FIG. 1 is a block diagram illustrating a configuration of a Non-Continuous Orthogonal Frequency Division Multiplexing (NC-OFDM) system according to example embodiments.

FIG. 1 is a block diagram illustrating a configuration of an NC-OFDM system 100 according to example embodiments.

A sensing unit 110 of the NC-OFDM system 100 may determine whether to use at least one frequency band. That is, the sensing unit 110 may sense whether to use a frequency of a licensed user to prevent a frequency band, allocated to the licensed user, from being used.

Figure 2:
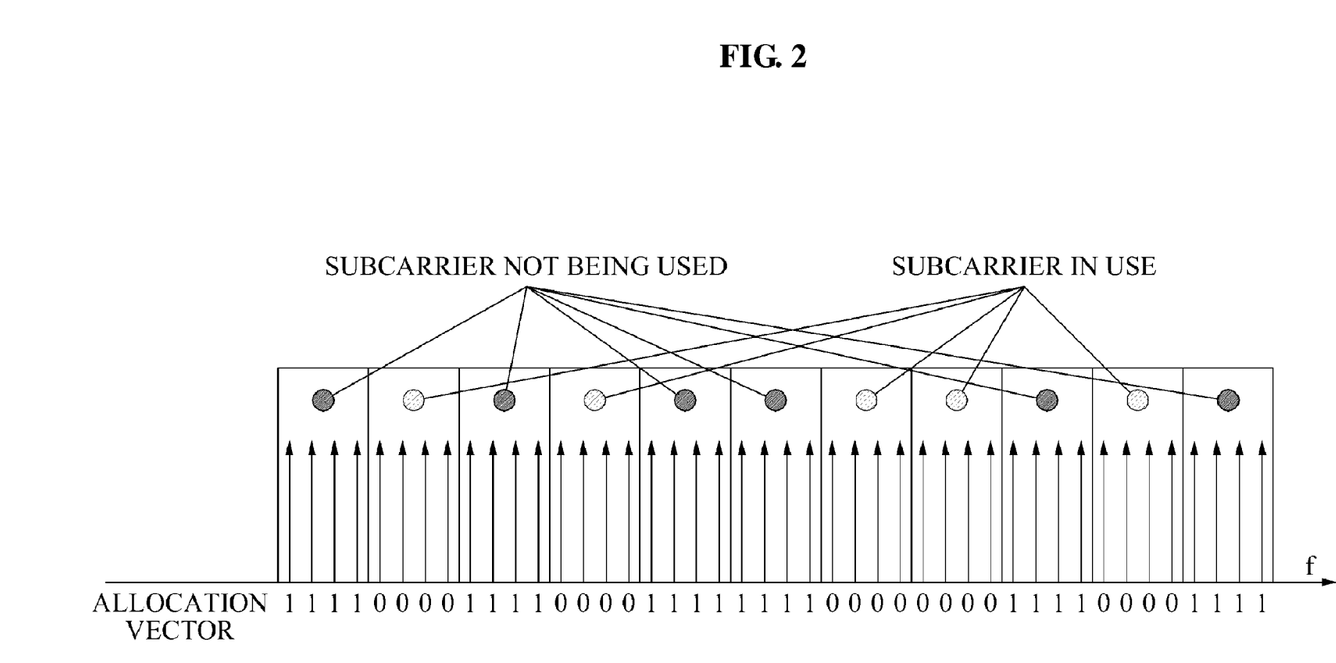
FIG. 2 is a diagram illustrating an example of allocating a subcarrier in an NC-OFDM system according to example embodiments.

FIG. 2 is a diagram illustrating an example of allocating a subcarrier in the NC-OFDM system 100 according to example embodiments.

In this instance, a band control unit 120 may disable a subcarrier with respect to a frequency band in use, as a result of the determination. Accordingly, a number of unnecessarily calculated points may be reduced.

That is, the NC-OFDM system 100 may disable the subcarrier by using an input signal or an output signal of '0', as illustrated in FIG. 2.

Figure 3:
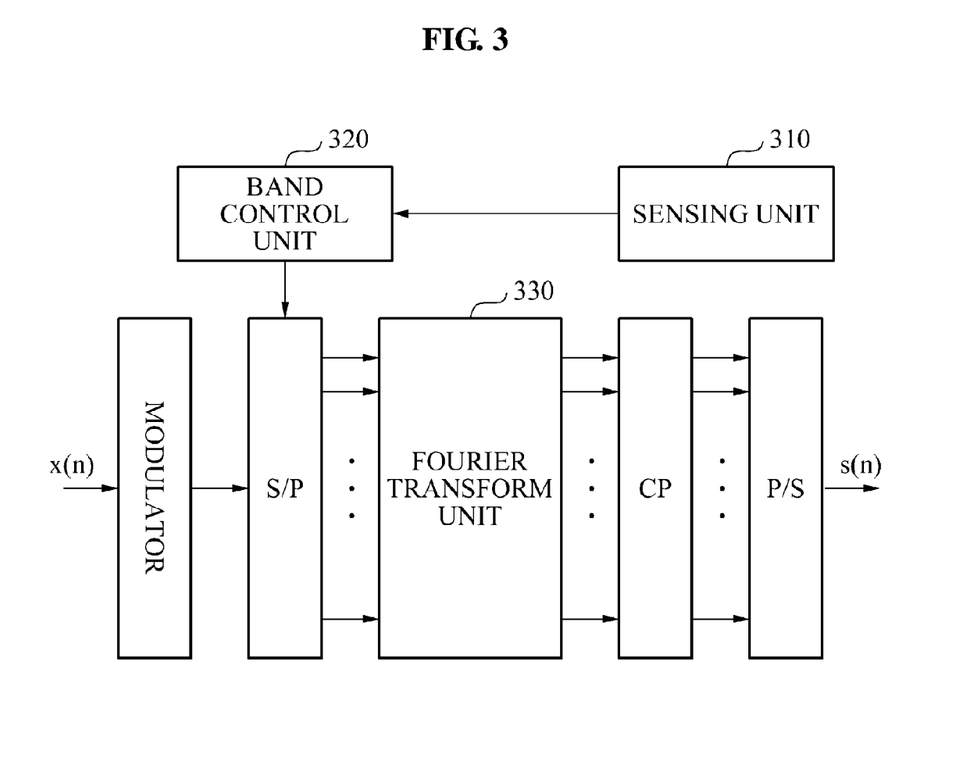
FIG. 3 is a block diagram illustrating a configuration of a transmitter of an NC-OFDM system according to example embodiments.
Figure 4:
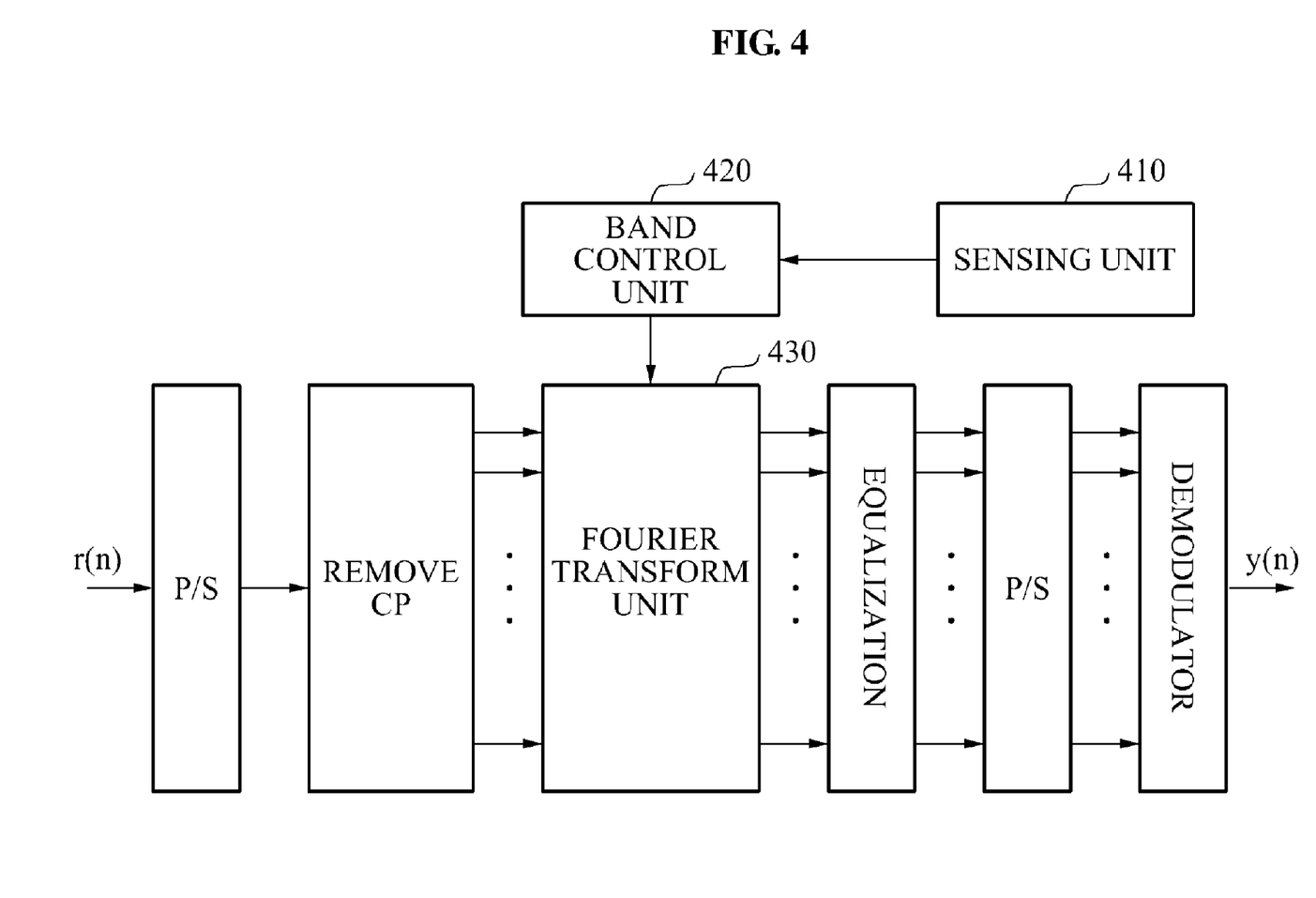
FIG. 4 is a block diagram illustrating a configuration of a receiver of an NC-OFDM system according to example embodiments.

FIG. 3 is a block diagram illustrating a configuration of a transmitter of the NC-OFDM system 100 according to example embodiments. FIG. 4 is a block diagram illustrating a configuration of a receiver in the NC-OFDM system 100 according to example embodiments.

As illustrated in FIGS. 3 and 4, the NC-OFDM system 100 may be applied to both transmitter and receiver.

For example, a sensing unit 310 of the NC-OFDM system 100 may ascertain a frequency usage environment change of a licensed user in an Inverse FFT (IFFT) operation in the transmitter, as illustrated in FIG. 3. When a frequency use changes, a band control unit 320 may disable a subcarrier, used by the licensed user, in an input end as illustrated in FIG. 2.

That is, the band control unit 320 may control the transmitter of the NC-OFDM system 100 to set an input signal as '0'.

For another example, a sensing unit 410 of the NC-OFDM system 100 may ascertain a frequency usage environment change of a licensed user in a FFT operation in the receiver, as illustrated in FIG. 4. When a frequency use changes, a band control unit 420 may disable a subcarrier used by the licensed user, as illustrated in FIG. 2. Here, the subcarrier may be a subcarrier of an output end.

That is, the band control unit 420 may control the receiver of the NC-OFDM system 100 to set an output signal as '0'.

In a general butterfly structure of a FFT, two output values may be determined by two input values. Accordingly, pruning is performed in each FFT stage, two input values of a butterfly may be '0'. Also, in general, a pruning path may decrease as a number of stages increases, and a pruning path may be determined by a number of inputs of '0' and distribution of inputs of '0'.

Accordingly, the NC-OFDM system 100 may provide a pruning algorithm for calculating a pruning matrix, which is described in detail below.

The apparatus and method of providing a pruning algorithm is described with reference to FIGS. 5 and 6.

Figure 5:
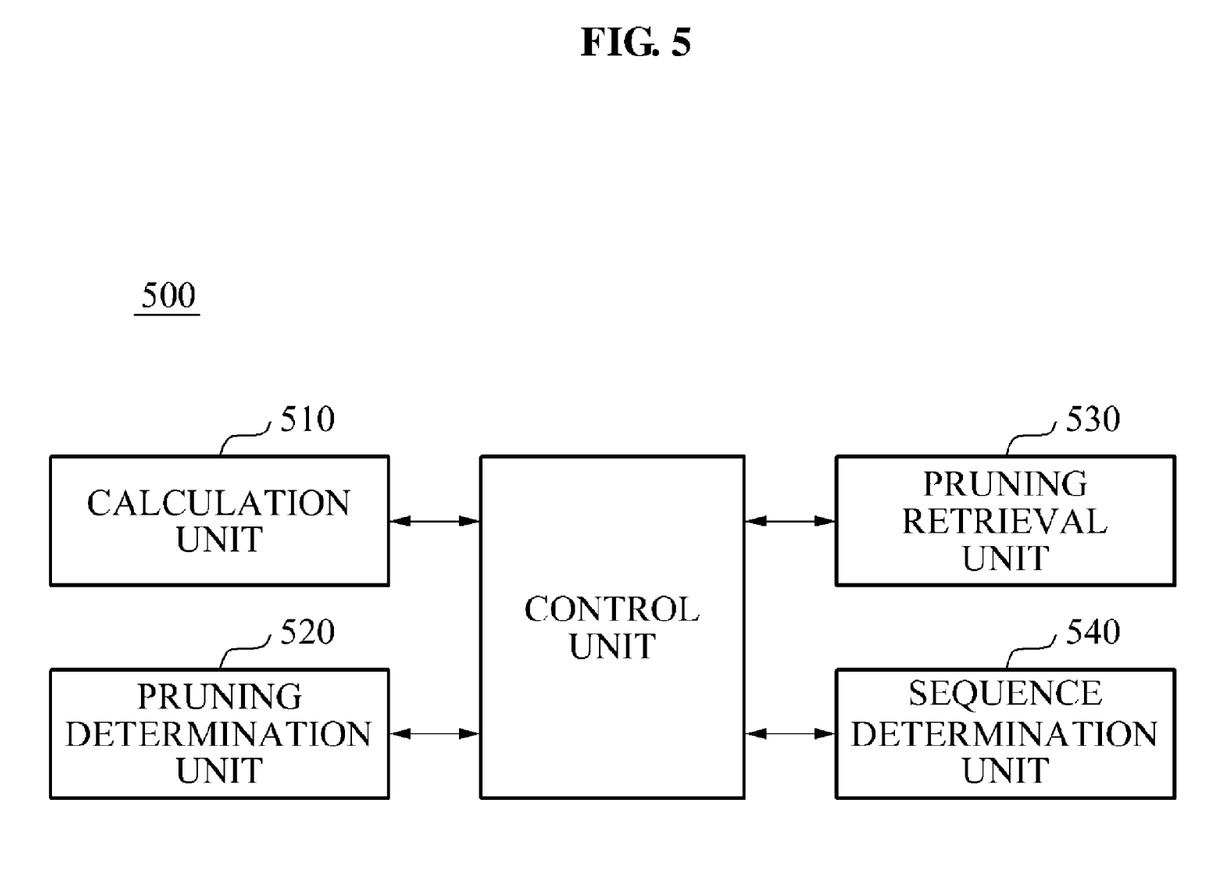
FIG. 5 is a block diagram illustrating a configuration of an apparatus for providing a pruning algorithm in an NC-OFDM system according to example embodiments.
Figure 6:
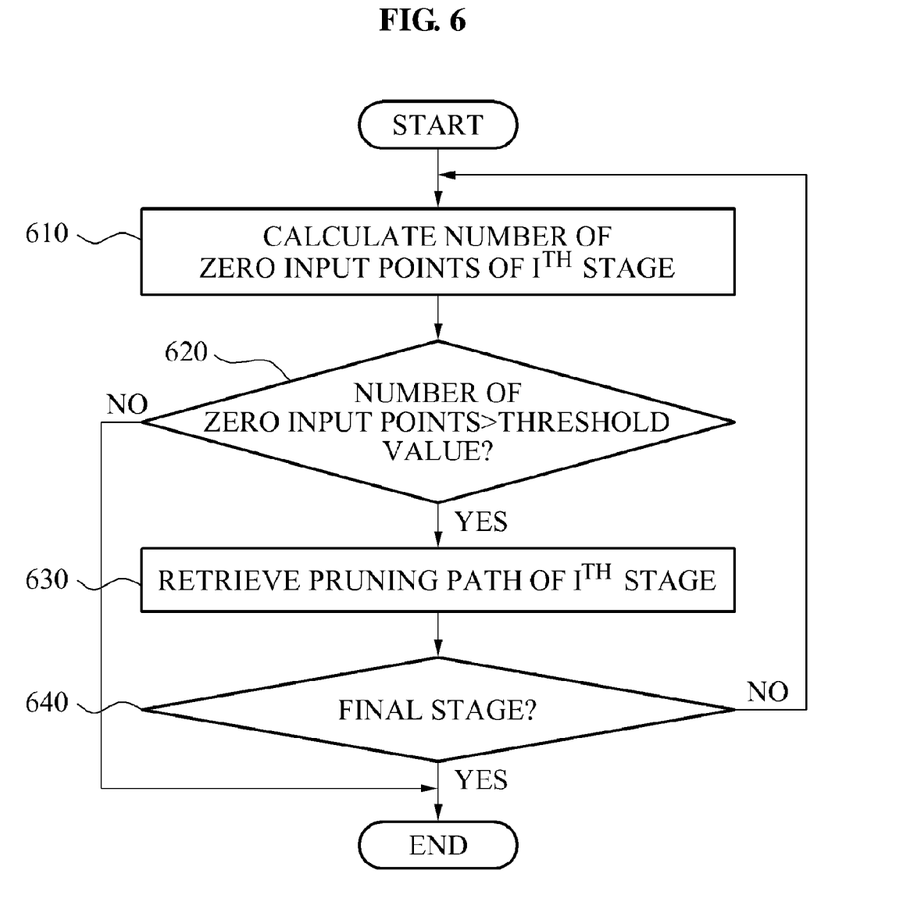
FIG. 6 is a flowchart illustrating a method of providing a pruning algorithm in an NC-OFDM system according to example embodiments.

FIG. 5 is a block diagram illustrating a configuration of an apparatus 500 for providing a pruning algorithm in an NC-OFDM system according to example embodiments. FIG. 6 is a flowchart illustrating a method of providing a pruning algorithm in an NC-OFDM system according to example embodiments.

In operation 610, a calculation unit 510 of the apparatus 500 for providing a pruning algorithm, hereinafter, referred to as the apparatus 500, may calculate a number of points where a subcarrier is disabled with respect to at least one frequency band of an $i^{th}$ stage.

In operation 620, a pruning determination unit 520 of the apparatus 500 may determine whether the number of points is greater than a threshold value.

In operation 630, a pruning retrieval unit 530 may retrieve a pruning path generated by the disabling of the subcarrier, when the number of points is greater than the threshold value.

For example, when a threshold value of zero input points of each stage is 'THi' and a number of zero input points of an $i^{th}$ stage is 'Ni', the apparatus 500 may perform pruning path retrieval when 'Ni' is greater than 'THi'. Also, when 'Ni' is not greater than 'THi', the apparatus 500 may finish the pruning path retrieval.

In operation 640, a sequence determination unit 540 of the apparatus 500 may determine whether the $i^{th}$ stage is a final stage. When the $i^{th}$ stage is not the final stage, the apparatus 500 may configure a loop circuit to enable the calculation unit 510 to calculate a number of points of a subsequent stage. Here, the points may indicate a point where the subcarrier is disabled.

According to example embodiments, an operation of retrieving a forward path and a backward path in the pruning path retrieval may be performed in a same manner.

That is, the pruning determination unit 130 of the NC-OFDM system 100 may determine whether the number of points is greater than the threshold value using the pruning algorithm provided by the apparatus 500.

In this instance, when the number of points is greater than the threshold value, the pruning retrieval unit 140 may retrieve the pruning path generated by the disabling of the subcarrier. However, when the number of points is less than the threshold value, the pruning retrieval unit 140 may discontinue the retrieval of the pruning path.

The NC-OFDM system 100 may perform a FFT or a IFFT where the pruning path is applied.

That is, after the transmitter may calculate a pruning matrix in a forward path, and the receiver may calculate a pruning matrix in a backward path, an IFFT/FFT may be performed with respect to each of the calculated pruning matrices.

For example, when the NC-OFDM system 100 is the transmitter, the pruning retrieval unit 140 may retrieve the pruning path in the forward path corresponding to the frequency band in use, and the Fourier transform unit 330 may perform an IFFT where the pruning path is applied.

For another example, when the NC-OFDM system 100 is the receiver, the pruning retrieval unit 140 may retrieve the pruning path in the backward path corresponding to the frequency band in use, and the Fourier transform unit 430 may perform a FFT where the pruning path is applied.

When a FFT is performed by the Fourier transform unit 150, the pruning retrieval unit 140 may retrieve the pruning path in the backward path corresponding to the frequency band in use.

Figure 7:
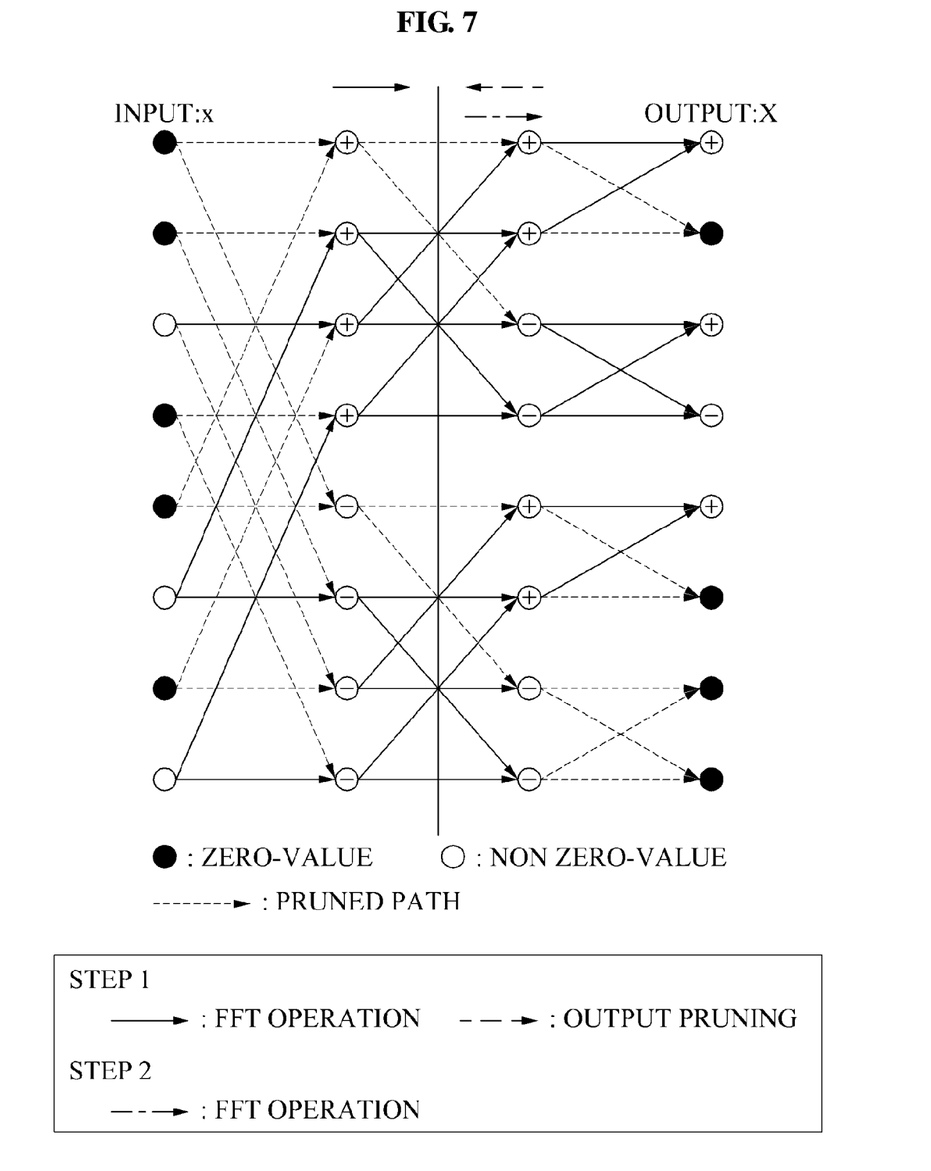
FIG. 7 is a flowchart illustrating an example of an OFDM operation where a pruning algorithm is applied according to example embodiments.

FIG. 7 is a flowchart illustrating an example of an OFDM operation where a pruning algorithm is applied according to example embodiments.

As illustrated in FIG. 7, the NC-OFDM system 100 may divide a FFT operation into two operations. When an input end may perform a FFT operation, an output end may simultaneously obtain a matrix where pruning is applied.

For another example, when a number of stages is ten, the NC-OFDM system 100 may perform forward pruning path retrieval from a step 1 to a step 6, and perform backward pruning path retrieval from a step 10 to a step 6.

Accordingly, the NC-OFDM system 100 may remove an unnecessary operation using a matrix of the output end, and perform remaining FFT operations.

Since the input end may use the pruning algorithm, unnecessary operations may be reduced and time may be saved. Also, since the output end simultaneously retrieves the pruning path when a FFT operation is performed, an operation of obtaining a matrix may not affect a total operation time. Also, when remaining operations are performed using the matrix, since pruning has been performed in the output end, a number of operations may be reduced and time may be saved.

A control method of the NC-OFDM system is described in detail with reference to FIG. 8.

Figure 8:
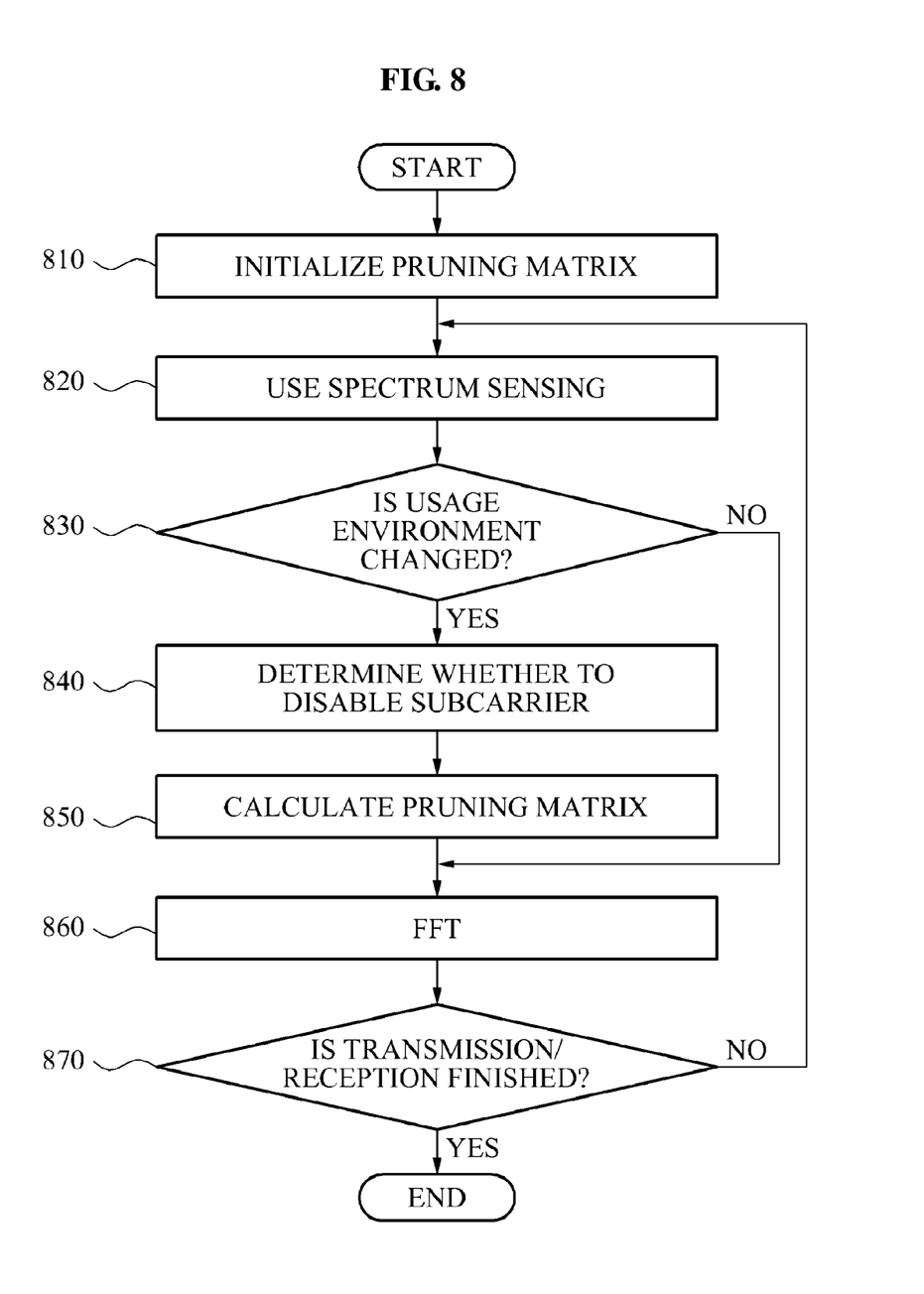
FIG. 8 is a flowchart illustrating a control method of an NC-OFDM system according to example embodiments.

FIG. 8 is a flowchart illustrating a control method of the NC-OFDM system 100 according to example embodiments.

In operation 810, the NC-OFDM system 100 may initialize a pruning matrix.

In operation 820, the NC-OFDM system 100 may determine whether to use at least one frequency band using a spectrum sensing method.

In operation 830, the NC-OFDM system 100 may determine whether a usage environment of the frequency band is changed. In operation 840, the NC-OFDM system 100 may determine whether to disable a subcarrier again, when the usage environment is changed.

That is, the NC-OFDM system 100 may disable the subcarrier of a frequency band in use.

In operation 850, the NC-OFDM system 100 may calculate a pruning matrix using a pruning algorithm provided as described above.

In operation 860, the NC-OFDM system 100 may perform a FFT using the calculated pruning matrix.

In operation 870, the NC-OFDM system 100 may determine whether a transmission/reception is finished.

According to example embodiments, when a FFT or IFFT operation used in a transmitter/receiver of an NC-OFDM system is performed, a subcarrier, which is not being used, may be disabled based on spectrum sensing information. Accordingly, complexity of the FFT or IFFT operation may be reduced.

Also, according to example embodiments, when an input or output, which is not used by a transmitter/receiver, exists, a retrieval stage of a pruning path may be limited. Accordingly, an algorithm that may reduce complexity and time for pruning path retrieval, and complexity of an entire FFT operation may be provided.

The control method of an NC-OFDM system and the method of providing a pruning algorithm of an NC-OFDM system according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Non-Continuous Orthogonal Frequency Division Multiplexing (NC-OFDM) system, comprising:
   a sensing unit to determine whether to use at least one frequency band;
   a band control unit to disable a subcarrier with respect to a frequency band in use as a result of the determination;
   a pruning determination unit to determine whether a number of points where the subcarrier is disabled is greater than a threshold value;
   a pruning retrieval unit to retrieve a pruning path generated by the disabling of the subcarrier, when the number of points is greater than the threshold value; and
   a Fourier transform unit to perform a Fast Fourier transform (FFT) or Inverse FFT (IFFT) by applying the pruning path to the subcarrier;
   wherein, when the FFT is performed by the Fourier transform unit, the pruning retrieval unit simultaneously performs the FFT and retrieves the pruning path in a backward path.

2. The NC-OFDM system of claim 1, wherein the band control unit controls a transmitter of the NC-OFDM system to set an input signal as 0.

3. The NC-OFDM system of claim 1, wherein the band control unit controls a receiver of the NC-OFDM system to set an output signal as 0.

4. The NC-OFDM system of claim 1, wherein, in a transmitter of the NC-OFDM system, the pruning retrieval unit retrieves the pruning path in a forward path corresponding to the frequency band in use.

5. The NC-OFDM system of claim 4, wherein the Fourier transform unit performs an IFFT by applying the pruning path.

6. The NC-OFDM system of claim 1, wherein, in a receiver of the NC-OFDM system, the pruning retrieval unit retrieves the pruning path in a backward path corresponding to the frequency band in use.

7. The NC-OFDM system of claim 6, wherein the Fourier transform unit performs a FFT by applying the pruning path.

8. The NC-OFDM system of claim 1, wherein, when the number of points is less than the threshold value, the pruning retrieval unit discontinues the retrieval of the pruning path.

9. An apparatus, comprising the following components of a Non-Continuous Orthogonal Frequency Division Multiplexing (NC-OFDM) system: a calculation unit to calculate a number of zero input points of a corresponding stage of a FFT (Fast Fourier Transform); a pruning determination unit to determine whether the number of zero input points is greater than a threshold value; and a pruning retrieval unit to retrieve a pruning path, generated by inputting zero, in response to determining that the number of zero input points is greater than the threshold value, divide an FFT operation into two operations, one of the two operations corresponding to an input end of the FFT operation, and the other of the two operations corresponding to an output end of the FFT operation, perform a FFT or IFFT (Inverse Fast Fourier Transform) at the input end, and at the output end, simultaneously obtain a matrix where the pruning path is applied.

10. The apparatus of claim 9, further comprising:

a sequence determination unit to determine whether the stage is a final stage, wherein, when the stage is different from the final stage, the calculation unit calculates a number of zero input points of a subsequent stage of the stage.

11. The apparatus of claim 9, wherein, in response to determining that the number of zero input points is less than the threshold value, the pruning retrieval unit discontinues the retrieval of the pruning path.

12. A control method, comprising, in a Non-Continuous Orthogonal Frequency Division Multiplexing (NC-OFDM) system: determining, by a sensing unit, whether to use at least one frequency band; disabling, by a band control unit, a subcarrier with respect to a frequency band in use as a result of the determination; determining, by a pruning determination unit, whether a number of points where the subcarrier is disabled is greater than a threshold value;

retrieving, by a pruning retrieval unit, a pruning path generated by the disabling of the subcarrier, in response to determining that the number of points is greater than the threshold value; and performing, by a Fourier transform unit, a FFT (Fast Fourier Transform) or IFFT (Inverse Fast Fourier Transform) where the pruning path is applied; wherein, when the FFT is performed, the pruning path in a backward path corresponding to the frequency band in use is simultaneously retrieved.

13. A method, comprising, in a Non-Continuous Orthogonal Frequency Division Multiplexing (NC-OFDM) system: calculating, by a calculation unit, a number of zero input points of a corresponding stage; determining, by a pruning determination unit, whether the number of zero input points is greater than a threshold value; retrieving, by a pruning retrieval unit, a pruning path, generated by inputting zero, when the number of zero input points is greater than the threshold value; and dividing, by the NC-OFDM system, the pruning path between a backward pruning path and a forward path among a plurality of stages in a pruning operation.

14. The method of claim 13, further comprising: determining, by a sequence determination unit, whether a current stage of the plurality of stages is a final stage, wherein, when the current stage is different from the final stage, the calculating, the determining, and the retrieving are performed with respect to a stage subsequent to the current stage.

* * * * *